United States Patent

Dunn, III et al.

[11] 4,061,167
[45] Dec. 6, 1977

[54] SINGLE PIECE TREE SHEAR BLADE HAVING CYLINDRICALLY CURVED CUTTING PORTION AND METHOD OF MAKING SAME

[75] Inventors: James Knox Dunn, III, Dubuque; Lee Everett Tucker, Eldridge; Andrew Paul Redman, Dubuque, all of Iowa

[73] Assignee: Deere & Company, Moline, Ill.

[21] Appl. No.: 741,288

[22] Filed: Nov. 11, 1976

[51] Int. Cl.² .................. B21D 17/02; B21K 21/00; A01G 23/08
[52] U.S. Cl. ..................... 144/34 E; 72/414; 76/101 R; 113/116 V; 144/309 R; 144/322
[58] Field of Search ........ 83/694; 76/101 R, 101 SM; 72/412, 414; 113/116 V, 116 W; 144/34 R, 34 E, 218, 309 R, 321, 322

[56] References Cited

U.S. PATENT DOCUMENTS

| 1,808,731 | 6/1931 | Ireland | 113/116 V |
| 1,873,720 | 8/1932 | Piker | 113/116 V |
| 2,297,625 | 9/1942 | Kotcher | 72/414 |

FOREIGN PATENT DOCUMENTS

| 1,112,037 | 8/1961 | Germany | 113/116 V |

Primary Examiner—Travis S. McGehee
Assistant Examiner—W. D. Bray

[57] ABSTRACT

A tree shear blade is formed by pressing a pre-shaped flat metal plate or blank into a die shaped to turn up opposite side and rear tabs of the blank to form mounting portions of the blade and to cylindrically curve a central portion of the blank to form a cutting portion of the blade. The side and rear tabs are then welded together.

10 Claims, 5 Drawing Figures

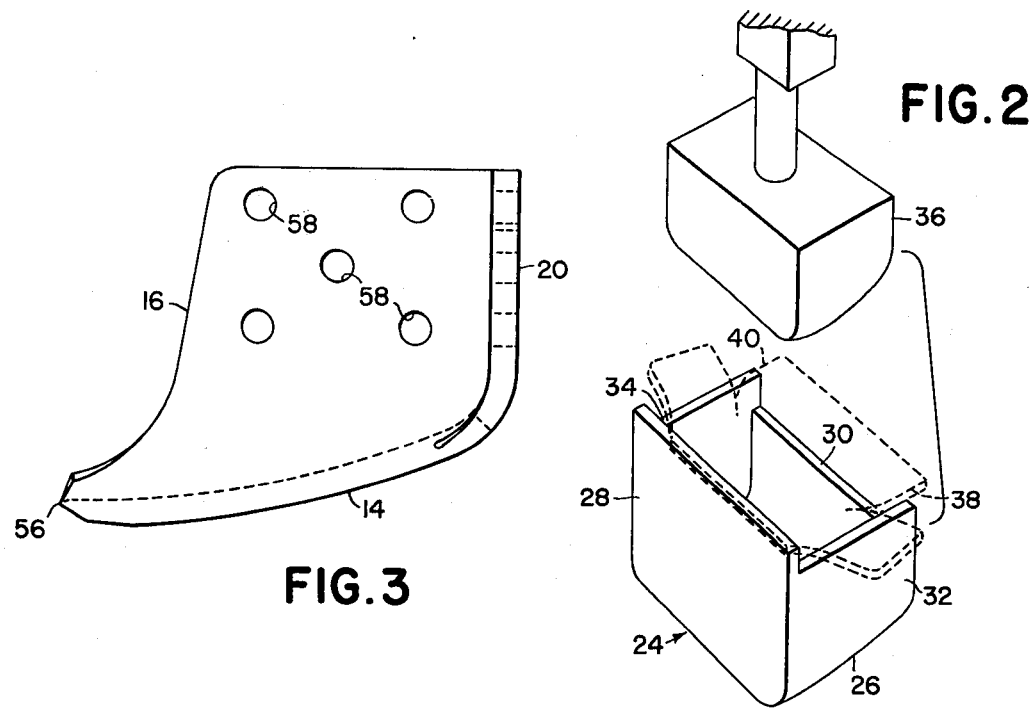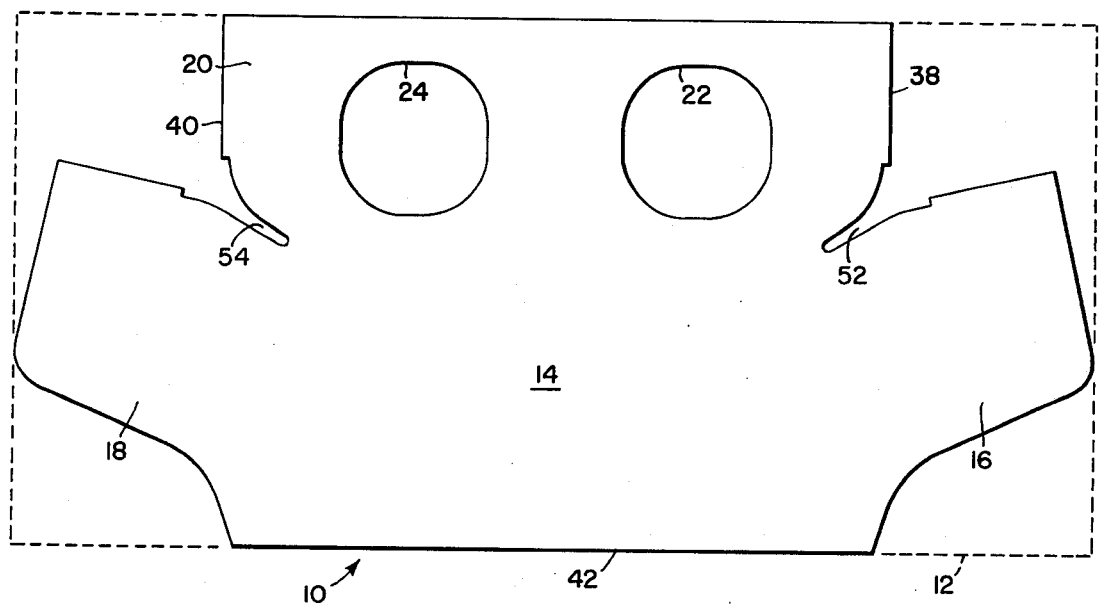

SINGLE PIECE TREE SHEAR BLADE HAVING CYLINDRICALLY CURVED CUTTING PORTION AND METHOD OF MAKING SAME

BACKGROUND OF THE INVENTION

The present invention relates to tree shear blades having cylindrically curved cutting portions and more specifically relates to a single piece blade and a method for making the same.

U.S. Pat. No. 3,826,295 issued to E. C. Johnson on July 30 1974, discloses a shear blade comprising a central curved plate defining a cutting portion to the upper surface of which are welded a pair of upright angle brackets, the angle brackets having a pair of complimentary brackets of a blade support arm bolted thereto. This blade construction is not entirely satisfactory since in some operations the welds between brackets and the blade become overstressed resulting in the separation of the brackets from the cutting portion.

SUMMARY OF THE INVENTION

According to the present invention there is provided a shear blade which represents an improvement of the blade disclosed in the aforementioned U.S. Pat. No. 3,826,295. A method for making the blade is also provided.

In the process for manufacturing the tree shear blade of the present invention, a rectangular metal plate is shaped into a blank including a central portion having tabs at three sides thereof. The free edge of the central portion is then at least partly sharpened to form a cutting edge. Then the blank is heated to approximately 1500° F and pressed into a die which bends the tabs upwardly from the central portion and bends the central portion such that it is cylindrically curved from a juncture with one of the tabs to a free edge of the central portion. The other two tabs are on the opposite sides of the one tab and are welded thereto. To finish the construction of the blade, a milling pass is made across the bottom of the free end of the central portion and mounting holes are drilled in the tabs.

An object of the invention is to provide a tree shear blade which will withstand high stresses imposed on mounting portions of the blade, and a method of making such a blade.

A more specific object is to provide a tree shear blade constructed by bending or forming a pre-shaped blank of flat plate material into a blade having upright mounting portions joined, by respective curved radius portions, to a central cylindrically curved cutting portion.

These and other objects will become apparent from reading the ensuing description together with the appended drawings.

BRIEF DESCRIPTION OF THE DRAWINGS

FIG. 1 is a top plan view of a flat plate pre-shaped into a blank from which a tree shear blade may be formed in accordance with the principles of the present invention.

FIG. 2 is a perspective view of a die and press foot for forming the blank shown in FIG. 1 into a shear blade.

FIG. 3 is an end view of a formed shear blade.

DESCRIPTION OF THE PREFERRED EMBODIMENT

Figure 4:
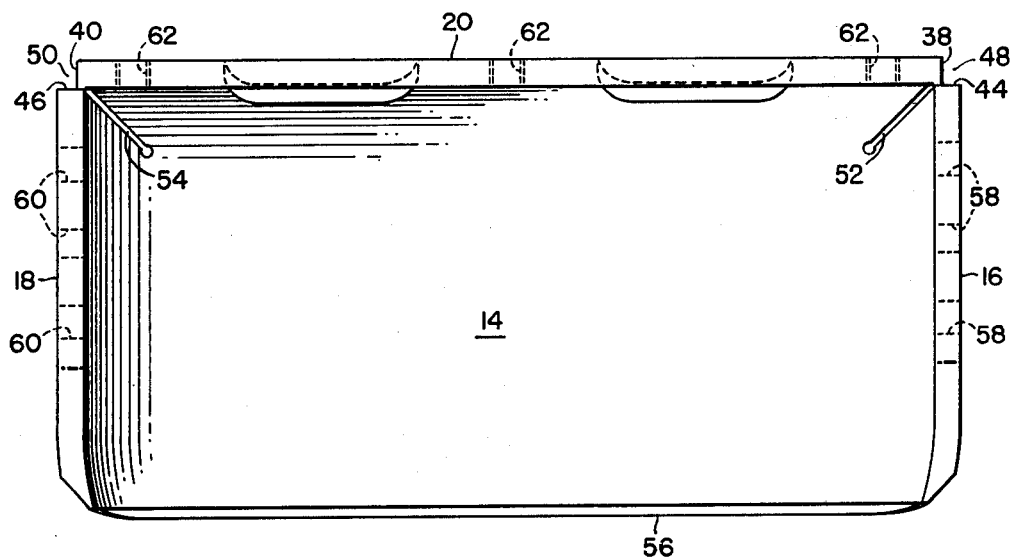
FIG. 4 is a top plan view of the formed shear blade.

Referring now to FIG. 1, therein is shown a flat metal plate preshaped to form a blank 10 from which a tree shear blade may be constructed. The blank 10 preferably begins as a rectangular plate, shown in dashed outline at 12, from which material at its four corners is removed, as by flame cutting, so as to leave a central portion 14 bounded by right and left (FIG. 1) tabs 16 and 18, respectively, and a top tab 20. Right and left holes 22 and 24 are provided in the tab 20, for a purpose to be explained below.

Referring now to FIG. 2, therein is schematically shown a die 24 generally in the shape of a rectangular box having a open top. Specifically, the die 24 includes a bottom wall 26 curved cylindrically between front and rear upright walls 28 and 30 respectively, and joined with opposite side walls 32 and 34, it being noted that a curved or radius section respectively joins each of the rear and opposite side walls with the bottom wall. Disposed above the die 24 is a complimentary shaped press tool or foot 36. The side walls 32 and 34 are separated from each other a distance only slightly greater than the distance between opposite ends 38 and 40 of the tab 20 of the blank 10 and, when the latter is placed properly for being engaged by the die 24, the edges 38 and 40 respectively, engage the inside surface of and the tabs 16 and 18 respectively overlie upper coplanar edges of the walls 32 and 34 and a free end 42 of the central portion 14 is disposed in engagement with the inner surface of the front wall 28. It is here noted that the upper edge of the rear wall 30 is disposed somewhat lower than the coplanar upper edges of the side walls 32 and 34 so that upon pressure being applied to the blank 10 by the tool 36 the tab 16 and 18 begin bending before the tab 20 engages the upper edge of the wall 30 and begins to bend. In order that the blank 10 will bend easily without undue stresses and distortion, it is preferably heated to about 1500° F before being subjected to the forming operation.

Figure 5:
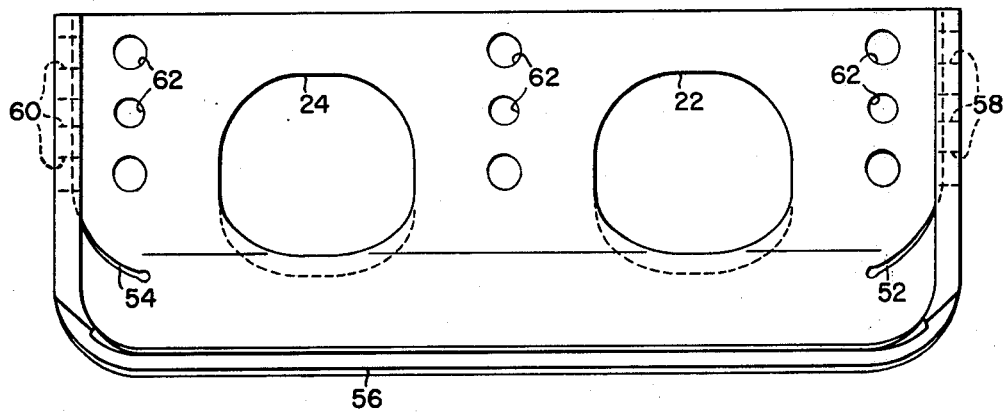
FIG. 5 is an elevational view of the formed blade, as viewed in the direction of the cutting edge thereof.

As can best be seen in FIGS. 3-5, once the blank 10 has been forced against the bottom wall 26 of the die 24, the tabs 16, 18 and 20 will extend upright from and be joined by respective curved portions with the central portion 14. Also, the ends 38 and 40 of the tab 20 will respectively be disposed perpendicular to respective edges 44 and 46 of the tabs 16 and 18 and will be positioned about half of the width across the edges 44 and 46 so as to form respective upright corner receptacles 48 and 50 for receiving weld material. Continuing on from the receptacles 48 and 50 for receiving weld material to join the tabs 16 and 18 with the tab 20 in respective curved portions of the tabs are grooves 52 and 54.

It is herenoted that prior to being subjected to the operation of the die 24 and tool 36, the edge 42 of the blank 10 is subjected to a sharpening operation which results in a cutting edge 56 (FIG. 3) being at least partly formed.

Once the blank 10 has been subjected to the operation of the die 24 and tool 36, and the tabs 16, 18 and 20 have been welded together, formation of the blank 10 into a shear blade is completed by making a milling pass along the underside of the free end of the central portion 14 to finish the cutting edge 56 and by drilling respective sets of mounting bolt holes 58, 60 and 62 in the tabs 16, 18 and 20. It is here noted that the holes 22 and 24 in the tab 20 are on an opposite side of the central portion 14 from the cutting edge 56 and serve to permit material such as dirt, debris and snow and the like to be expelled when the cutting edge 56 is passing through a tree being sheared.

The method of making the shear blade and the operation of the blade are thought to be easily understood from the foregoing and for the sake of brevity no further discussion is presented.

We claim:

1. The method of making a tree shear blade having a cylindrically curved cutting portion, comprising: the steps of shaping a blank from a metal plate so as to have a central blade portion adapted for passing through a tree being sheared, first and second tab portion respectively at opposite ends of the central blade portion and a third tab portion at one side of the central blade portion; sharpening a second side of the central blade portion opposite from said one side thereof to form a cutting edge; placing the blank on a die shaped for causing the pair of tabs to be bent towards each other to form upright ends of the blade, for causing the third tab to be bent to form an upright back plate extending between the pair of tabs and for causing the central blade portion to become cylindrically curved; engaging the blank with a press foot, configured for moving the blank against the die and thereafter causing the press foot to so move the blank; removing the shaped blank from the die; and welding the tabs together.

2. The method set forth in claim 1 and further including the step of heating the blank to approximately 1500° F prior to the step of placing the blank on the die.

3. The method of making a tree shear blade having a cylindrically curved cutting portion comprising the steps of: providing a blank of metal plate having a central blade portion having an exposed edge and having first and second tabs formed integrally with opposite ends thereof and a third tab formed integrally therewith at a location opposite from said exposed edge; forming said exposed edge into a cutting edge; forming the blank such that the central blade portion is cylindrically curved and the first, second and third tabs project generally at right angles to the central blade portion; and welding the tabs together.

4. The method defined in claim 3 and further including the step of heating the blank to approximately 1500° F before the forming thereof.

5. The method defined in claim 3 wherein the forming of the blank is sequenced such that the first and second tabs are bent ahead of the third tab and the third tab is then bent into engagement with the first and second tabs.

6. The method defined in claim 3 and further including the step of cutting material relief opening means in the third tab prior to the forming step, at a location so as to be partly located on a bend line between the third tab and central blade portion when the forming step is completed.

7. The method defined in claim 3 and including in the forming step the step of forming respective radii at the juncture between the first, second and third tabs and the central blade portion.

8. A method of making a tree shear blade having a cylindrically curved cutting portion comprising the steps of providing a rectangular flat metal blank; cutting material from the corners of the blank so as to define first and second tabs at opposite ends of the blank and a third tab at one side of the blank, forming the blank such that the first, second and third tabs project substantially at respective right angles from a central portion of the blank having an exposed edge on a side opposite from the third tab; forming said exposed edge into a cutting edge; and welding the tabs together.

9. In a tree shear blade including a central cutting portion curved cylindrically from a leading cutting edge toward a trailing portion, the cutting portion having opposite ends and mounting bracket means extending upwardly from the cutting portion adjacent the trailing portion and opposite ends thereof, the improvement comprising: said shear blade being of one piece construction wherein the mounting bracket means includes a first tab contiguous with and extending upwardly from the trailing portion of the cutting portion; and second and third tabs respectively contiguous with and extending upwardly from the opposite sides of the cutting portion; and said second and third tabs having respective upright edges disposed adjacent to respective upright edges of the first tab and welded thereto.

10. The tree shear blade defined in claim 9 wherein respective junctures between the first, second and third tabs are the cutting portion are curved.

* * * * *